US012769629B2

(12) United States Patent
Duplys

(10) Patent No.: US 12,769,629 B2
(45) Date of Patent: Oct. 20, 2026

(54) METHOD FOR MONITORING AN APPLICATION FOR PROVIDING AT LEAST ONE SAFETY-CRITICAL FUNCTION FOR A VEHICLE

(71) Applicant: Robert Bosch GmbH, Stuttgart (DE)

(72) Inventor: Paulius Duplys, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 7 days.

(21) Appl. No.: 18/976,770

(22) Filed: Dec. 11, 2024

(65) Prior Publication Data

US 2025/0199927 A1 Jun. 19, 2025

(30) Foreign Application Priority Data

Dec. 15, 2023 (DE) ..................... 10 2023 212 765.2

(51) Int. Cl.
*G06F 11/30* (2006.01)
*G06F 11/3604* (2025.01)

(52) U.S. Cl.
CPC ...... *G06F 11/3013* (2013.01); *G06F 11/3612* (2013.01)

(58) Field of Classification Search
CPC ......................... G06F 11/3013; G06F 11/3612
See application file for complete search history.

(56) References Cited

U.S. PATENT DOCUMENTS

2021/0284030 A1* 9/2021 Lam ..................... G07C 5/0816
2024/0045657 A1* 2/2024 Ma .......................... G06F 9/546
2024/0272892 A1* 8/2024 Gupta ....................... G06F 8/65
2024/0272922 A1* 8/2024 Lu ....................... G06F 11/3423
2025/0039015 A1* 1/2025 Smid ....................... H04L 12/40

FOREIGN PATENT DOCUMENTS

DE 102020131998 A1 6/2022
EP 3291094 A1 3/2018

* cited by examiner

*Primary Examiner* — Zachary K Huson
(74) *Attorney, Agent, or Firm* — Norton Rose Fulbright US LLP

(57) ABSTRACT

A method for monitoring an application for providing at least one safety-critical function for a vehicle. The method includes: providing at least one monitoring function of the application, wherein the at least one monitoring function generates a defined signal based on at least one runtime characteristic of the application in order to specify the at least one runtime characteristic via the defined signal, wherein the runtime characteristic describes at least a course of one or more runtime events; reading out the generated defined signal using a monitoring component; monitoring the application based on an analysis of the read-out generated defined signal by the monitoring component. A computer program, a device, and a storage medium are also described.

20 Claims, 2 Drawing Sheets

METHOD FOR MONITORING AN APPLICATION FOR PROVIDING AT LEAST ONE SAFETY-CRITICAL FUNCTION FOR A VEHICLE

FIELD

The present invention relates to a method for monitoring an application for providing at least one safety-critical function for a vehicle. The present invention furthermore relates to a computer program, a device, and a storage medium for this purpose.

BACKGROUND INFORMATION

Safety-critical software-controlled systems such as vehicles, especially software-defined vehicles (SdVs), require comprehensive application monitoring to ensure reliable and trustworthy operation. More specifically, software applications must be monitored to quickly detect any behavior that deviates from the expected behavior, whether as a result of a random error or an intentional cyber attack.

However, implementing comprehensive application monitoring for systems such as vehicles is challenging and cannot be adequately realized with established solutions, since the applications in such systems are written by different software companies or independent developers and an integrator, e.g. an OEM, does not know the exact expected behavior of these applications.

As a result, existing techniques only allow for progress monitoring but not detailed monitoring. More importantly, existing techniques require detailed knowledge of the internal structure and functionality of the corresponding software application. However, this is challenging in multi-tier systems such as vehicles, where applications are created by numerous third parties and then are run on the platform of the integrator, e.g. an OEM, who has no control over these third parties.

Existing monitoring techniques are based for example on hardware or software-based monitoring, usually through a watchdog. These techniques can be used for progress monitoring. For example, a watchdog can be configured to interrupt an application if it does not terminate after a certain period of time. However, such techniques are very restricted and therefore limited in their effectiveness. For example, these techniques cannot detect an erroneous calculation result or a change in control currents. The procedures known according to the prior art are also limited with regard to the required internal knowledge of each application. For example, configuring a watchdog to interrupt an application after a certain period of time requires detailed knowledge of the internals of the application, i.e. the implementation details.

SUMMARY

The present invention includes a method, a computer program, a device, and a computer-readable storage medium. Features of and details relating to the present invention are disclosed herein. Features and details which are described in connection with the method according to the present invention of course also apply in connection with the computer program according to the present invention, the device according to the present invention, and the computer-readable storage medium according to the present invention, and respectively vice versa, so that, with respect to the disclosure, mutual reference is or can be made to the individual aspects of the present invention at all times.

The present invention includes a method for monitoring an application for providing at least one safety-critical function for a vehicle. According to an example embodiment of the present invention, the method includes the following steps, it being possible for the steps to be carried out repeatedly and/or successively. In the context of the present invention, an application is in particular a software application. The safety-critical function is in particular critical for the safety of the vehicle with regard to system damage and/or personal injury. The method can be particularly advantageous for vehicles, since in this case the vehicle-specific applications are important for the correct functioning of the vehicle. In particular for safety-critical applications, it can therefore be important to provide monitoring of each application.

In a first step, preferably at least one monitoring function of the application is provided. The at least one monitoring function generates a defined signal, in particular on the basis of at least one runtime characteristic of the application, in order to specify the at least one runtime characteristic via the defined signal. The runtime characteristic preferably describes at least a course of one or more runtime events. The defined signal is in particular a specific message containing relevant information on the at least one runtime characteristic, such as a current value or an average value of the last hundred values. A structure or a data schema of such a message or the defined signal can be described in corresponding documentation. Once generated, the monitoring function can write the defined signal to a specific destination or resource such as a file, socket, or RESTful API. In the context of the present invention, the monitoring function may also be referred to and understood as a signaling function.

In a further step, the generated defined signal is preferably read out by means of a monitoring component. Reading out can be performed via a corresponding connection to the above-mentioned destination or the resource, i.e. the monitoring component can, for example, read the file into which the defined signal was written. The monitoring component may be a software module and may be implemented in the technical system, preferably as an application-independent software module. Alternatively, the monitoring component may also be implemented on an external data processing device such as a server.

In a further step, the application is preferably monitored by means of the monitoring component on the basis of an analysis of the read-out generated defined signal. As a result, the method according to the present invention can advantageously monitor the application of the technical system without knowledge of internal functioning and without, for example, having access to a source code of the application. Monitoring includes in particular the analysis of values or information of the read-out generated defined signal with regard to specific specifications or requirements of each application.

The defined signal is preferably a standardized message which comprises relevant current information about the at least one runtime characteristic. The standardized message can be standardized in the sense that a structure of the message can be specified depending on a relevant runtime characteristic in order to standardize it. This allows the method to be used advantageously in different applications and vehicles without knowledge of how each application works.

The at least one monitoring function can record the one or more runtime events and reproduce them by the at least one runtime characteristic through the defined signal. The one or more runtime events are in particular specific to a current functionality of the application. The runtime events can be, for example, a runtime of functions, calculation results of functions, and/or specific memory accesses.

According to an example embodiment of the present invention, in a further possibility, the method may further comprise the following step:

carrying out an additional analysis of the at least one runtime characteristic by means of the monitoring function in order to additionally generate the defined signal taking into account the additional analysis.

The additional analysis can, for example, be a calculation of an average value or a determination of a minimum or maximum value. Furthermore, during the additional analysis, the monitoring function of the application can already evaluate whether a value of at least one runtime characteristic exceeds a certain threshold value. A result of the steps described above can then be communicated using the defined signal.

According to a further advantage, the method may further comprise the following step:

carrying out at least one measure on the basis of a result of the analysis of the read-out generated defined signal.

The result may indicate, for example, that the read-out generated defined signal deviates from an expected value or an expected pattern. If this is the case, at least one measure may be implemented. The at least one measure can be, for example, terminating at least one process of the application, terminating the application, adapting at least one access restriction of the application to the technical system, closing at least one port of the technical system, and/or adapting at least one filter rule with regard to data exchange of the application, or can comprise at least one of these steps.

Furthermore, according to an example embodiment of the present invention, the monitoring function is optionally executed at a defined periodicity. This makes it possible to determine when and how often the monitoring function is executed, individually and depending on the specific application case. Executing the monitoring function includes in particular generating the defined signal.

Furthermore, according to an example embodiment of the present invention, within the scope of the present invention it is optionally possible for the at least one runtime characteristic to be an execution time of at least one function of the application and/or an execution time of the entire application. Thus, on the basis of the execution time of the at least one function and/or the application, it is advantageously possible to conclude faulty behavior of the application or behavior of the application that has been altered by external influences. The external influence can, for example, be a hacking attack on the technical system.

In addition, it is possible within the scope of the present invention that the at least one runtime characteristic is an access pattern of the application to at least one system resource of the technical system, the method further comprising the following steps:

defining a specification for the access pattern, comparing the access pattern of the application with the defined specification for the access pattern, the defined signal being generated taking into account a result of the comparison.

The access pattern may, for example, comprise a number of accesses and/or a sequence of accesses to the at least one system resource of the technical system. A system resource can be, for example, a peripheral, a bus or a bus system, a network such as Ethernet, a register or a comparable software and/or hardware resource of the technical system.

According to an example embodiment of the present invention, it may furthermore be possible for the method to further comprise the following step:

checking the application and the monitoring component on the basis of a bidirectional interaction between the application and the monitoring component with a defined message structure.

This is a good way to ensure that both the application and the monitoring component behave as expected. In this case, for example a valid response from the application may depend on a previous message from the monitoring component. The bidirectional interaction is preferably performed using the monitoring function of the application. As an example, a monitoring function and the monitoring component could implement a finite state machine that accepts a language L. Proceeding from previous messages, the monitoring function and the monitoring component could alternately generate a next message, producing the resulting word in the language L.

Advantageously, in the context of an example embodiment of the present invention, the method may further comprise the following steps:

checking whether the application already has the at least one monitoring function and/or at least one alternative monitoring function, the application being adapted on the basis of at least one already present monitoring function and/or the at least one alternative monitoring function if a monitoring function is already present.

This advantageously makes it possible to determine whether the application is safe for use in the technical system, since monitoring is possible using the monitoring function provided. The application can be adapted on the basis of the existing monitoring function in that it is configured to generate the defined signal. In this case, an alternative suitable monitoring function can also be modified accordingly.

According to an example embodiment of the present invention, in a further possibility, the vehicle may be a software-defined vehicle and the application may be a vehicle-specific application. A software-defined vehicle (SdV) is in particular a concept that refers to vehicles in which software and digital technologies play a central role in the functioning and functions of the vehicle. In a software-defined vehicle, the software is in particular a key driver for innovation, performance improvements, and new functions. The monitoring component can, for example, be part of the vehicle or part of an external data processing device. If at least two monitoring components are provided, it is also possible, for example, for one of them to be part of the vehicle and the other to be part of the external data processing device. The external data processing device may, for example, be a server such as a cloud server.

It is thus possible for the method according to the present invention to be used in a vehicle. The vehicle may be configured for example as a motor vehicle and/or passenger vehicle and/or autonomous or at least partially autonomous vehicle. The vehicle may comprise a vehicle mechanism, for example for providing an autonomous driving function and/or a driver assistance system. The vehicle mechanism may be designed to at least partially automatically control and/or accelerate and/or brake and/or steer the vehicle.

The present invention also relates to a computer program, in particular a computer program product, comprising commands which, when the computer program is executed by a computer, cause the computer to carry out the method according to the present invention. The computer program according to the present invention thus delivers the same advantages as have been described in detail with reference to a method according to the present invention.

The present invention also relates to a device for processing data that is configured to carry out the method according to the present invention. For example, a computer which executes the computer program according to the present invention can be provided as the device. The computer can have at least one processor for executing the computer program. A non-volatile data memory can also be provided, in which the computer program is stored and from which the computer program can be read by the processor for execution.

The present invention can also relate to a computer-readable storage medium which comprises the computer program according to the present invention and/or commands which, when executed by a computer, cause the computer to carry out the method according to the present invention. The storage medium is formed, for example, as a data memory such as a hard drive and/or a non-volatile memory and/or a memory card. The storage medium can be integrated into the computer, for example.

Furthermore, the method according to the present invention can also be carried out as a computer-implemented method.

Further advantages, features and details of the present invention can be found in the following description, in which exemplary embodiments of the present invention are described in detail with reference to the figures. The features mentioned in herein can be essential to the present invention, individually or in any combination.

DETAILED DESCRIPTION OF EXAMPLE EMBODIMENTS

Figure 1:
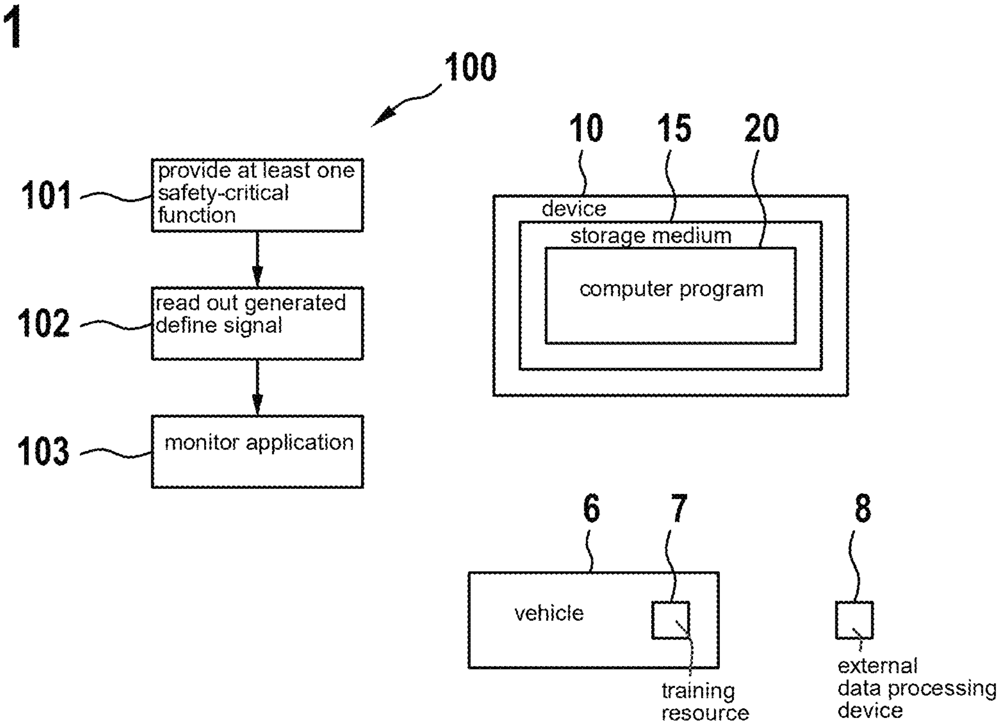
FIG. 1 is a schematic visualization of a method, a technical system having a system resource, an external data processing device, a device, a storage medium, and a computer program according to exemplary embodiments of the present invention.

FIG. 1 schematically shows a method 100, a technical system 6 having a training resource 7, an external data processing device 8, a device 10, a storage medium 15, and also a computer program 20 according to exemplary embodiments of the present invention.

FIG. 1 shows in particular an exemplary embodiment of a method 100 for monitoring an application 1 for providing at least one safety-critical function for a vehicle 6. In a first step 101, at least one monitoring function 2 of the application 1 is provided, the at least one monitoring function 2 generating a defined signal on the basis of at least one runtime characteristic 4 of the application 1 in order to specify the at least one runtime characteristic 4 via the defined signal. In this case, the runtime characteristic 4 describes at least a course of one or more runtime events. In a second step 102, the generated defined signal is read out by means of a monitoring component 5. In a third step 103, the application 1 is monitored by means of the monitoring component 5 on the basis of an analysis of the read-out generated defined signal.

In the context of the present invention, in particular monitoring functions 2 are used which can be added to applications 1, i.e. in particular software applications. These monitoring functions 2 can then be configured and designed by application developers, in particular third parties, to send a standardized signal, e.g. a message described in a technical specification, to a specific standardized endpoint such as a file, a socket or a port. A monitoring component 5 can then be used to collect these signals and respond to them, e.g. on the basis of a previously defined set of rules.

Figure 2:
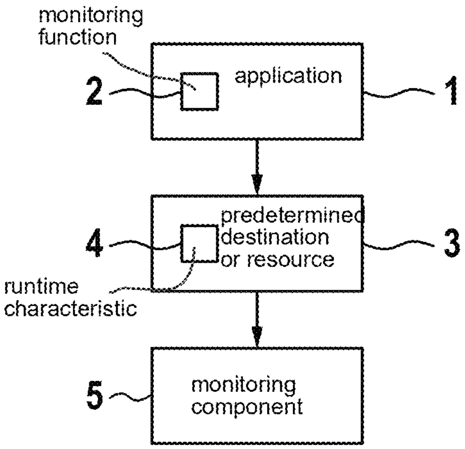
FIG. 2 is a schematic representation of a course of the method according to exemplary embodiments of the present invention.

FIG. 2 shows an exemplary embodiment of the present invention. In this case, in particular one or more monitoring functions 2 are added to an application 1, in particular a software application.

The monitoring functions 2 preferably determine one or more runtime characteristics 4 of the application 1, optionally pre-process them, and report the runtime characteristics 4 to a predetermined destination 3 or resource, such as a file, a socket or a RESTful API.

A monitoring component 5 preferably reads out the destination 3, in particular regularly, in order to monitor the application 1. The monitoring component 5 according to exemplary embodiments advantageously does not require any knowledge about the application 1. According to exemplary embodiments, the runtime characteristics 4 can be calculated and/or determined by the application 1 itself. The monitoring component 5 then in particular only has to read the destination 3. If the runtime characteristics 4 originate from a standard set of application monitoring features, the monitoring component 5 may also apply a predefined or dynamic set of rules, although this last step is not shown in FIG. 2.

The monitoring function 2 can signal various events of the runtime characteristics 4, including but not limited to the following. An access or access time and/or access frequency to peripheral devices, buses such as CAN, networks such as Ethernet, CPU registers, or other operating system or CPU resources. One or more network messages, such as CAN messages, or a pattern or structure of network messages such as CAN messages, transmitted on the bus or over the network. A specific message or a specific pattern or a specific structure of messages received or sent by the application 1.

Alternatively or additionally, the monitoring function 2 may generate the defined signal in a reverse mode if such an event does not occur. In other words, the monitoring function 2 can observe the behavior of the application 1 on the basis of one of the above or similar metrics and issue a signal if the observed behavior does not match the expected behavior.

According to a possible alternative, the monitoring functions 2 are provided in the form of a library, so that an app store or a runtime environment, e.g. in an SdV, checks whether an application 1 uses a certain set of monitoring functions 2 before allowing downloading or execution of that application 1.

According to another alternative, the monitoring functions comprise 2 probes triggered every n microseconds or at a certain periodicity.

According to a further alternative, the monitoring functions 2 write the execution times of one or more functions, comprised by the application 1, to the destination 3. In this way, the monitoring component 5 can detect deviations from the expected behavior of application 1, even if the output of application 1 is correct. For example, if a sophisticated malware were to change the control flow of the application 1, such monitoring functions 2 could detect this event even if the malware were careful not to change the output of the application 1. Conventional techniques such as comparing the output with a given threshold or checking an invariant of the output would not detect the malware.

According to a further alternative, the monitoring functions 2 observe the access of the application 1 to the system resources, e.g. memory locations or lines, and compare it with a certain, previously defined pattern. A certain monitoring function 2 then preferably writes to the destination 3 whether the previously defined pattern was observed or not. This advantageously makes it possible to determine whether selected functions of the application 1 were called up in a specific order.

Figure 3:
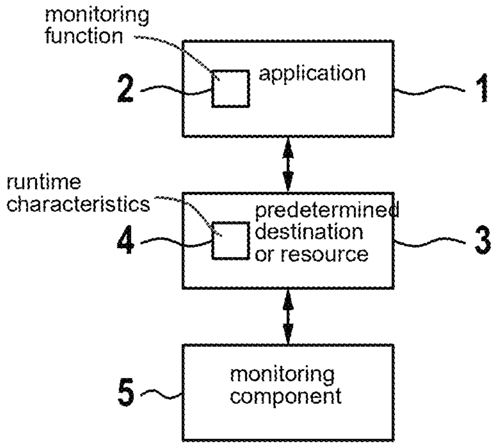
FIG. 3 is a schematic representation of an alternative course of the method according to exemplary embodiments of the present invention.

FIG. 3 shows a further possible alternative. For example, if the application 1 is developed internally, the application 1 and the monitoring component 5 can interact in order to ensure that both the application 1 and the monitoring component 5 behave as expected. In this case, a valid response from the application 1 may depend on a previous request or message from the monitoring component 5. As an example, a monitoring function 2 that monitors the application 1 and the monitoring component 5 could implement a finite state machine that assumes a language L. Proceeding from previous symbols or messages, the monitoring component 5 and the application 1 can alternately generate the next symbol or the next message, so that the resulting message is created in the language L.

The present invention according to exemplary embodiments advantageously does not require any knowledge of the internal functioning of applications 1. While existing techniques monitor the application 1, the present invention according to exemplary embodiments describes a concept for semi-self-monitoring applications 1 in the sense that the monitoring logic is integrated into the applications 1, but an external, system-wide monitoring component 5 can be used to collect the data and react to these data.

The above description of the embodiments describes the present invention exclusively in the context of examples. Of course, individual features of the embodiments, provided they make technical sense, can be freely combined with one another without departing from the scope of the present invention.

The invention claimed is:

1. A method for monitoring an application for providing at least one safety-critical function for a vehicle, the application being one of a plurality of applications of the vehicle, the method comprising the following steps:

executing, by a vehicle computing system, the application, the execution of the application providing the at least one safety-critical function during runtime of the application, wherein:

at least one monitoring function is integrated into the application; and during the runtime of the application, the at least one monitoring function:

generates a defined signal that specifies at least one runtime characteristic that describes at least a course of one or more runtime events of the application, the defined signal being a standardized message having a structure corresponding to the at least one runtime characteristic; and writes the generated defined signal to a predetermined destination or resource accessible by a monitoring component external to the application;

reading out, by the monitoring component, the generated defined signal from the predetermined destination or resource; and monitoring, by the monitoring component, runtime behavior of the application during continued execution of the application based on an analysis of the read-out generated defined signal, wherein the monitoring component is configured as a system-wide monitoring component that is external to each of the plurality of applications and that monitors the plurality of applications based on respective defined signals generated by respective monitoring functions integrated into respective ones of the plurality of applications.

2. The method according to claim 1, wherein the standardized message includes a current item of information about the at least one runtime characteristic, wherein the one or more runtime events are recorded by the at least one monitoring function and are represented by the at least one runtime characteristic, the one or more runtime events being specific to a current functionality of the application.

3. The method according to claim 1, wherein the method further comprises the following step:

carrying out, by the at least one monitoring function during the runtime of the application, an additional analysis of the at least one runtime characteristic, the defined signal being generated taking into account the additional analysis.

4. The method according to claim 1, wherein the method further comprises the following step:

carrying out at least one measure based on a result of the analysis of the read-out generated defined signal, the at least one measure including terminating at least one process of the application, and/or terminating the application, and/or adapting at least one access restriction of the application to the vehicle, and/or closing at least one port of the vehicle, and/or adapting at least one filter rule with regard to a data exchange of the application.

5. The method according to claim 1, wherein the at least one monitoring function is executed at a defined periodicity.

6. The method according to claim 1, wherein the at least one runtime characteristic is an execution time of at least one function of the application and/or an execution time of the entire application.

7. The method according to claim 1, wherein the at least one runtime characteristic is an access pattern of the application to at least one system resource of the vehicle, and wherein the method further comprises the following steps:

defining a specification for the access pattern; and comparing the access pattern of the application with the defined specification for the access pattern, the defined signal being generated taking into account a result of the comparison.

8. The method according to claim 1, wherein the method further comprises the following step:

checking the application and the monitoring component based on a bidirectional interaction between the application and the monitoring component with a defined message structure.

9. The method according to claim 1, wherein the method further comprises the following steps:

before executing the application, checking whether the application already has the at least one monitoring function and/or at least one alternative monitoring function; and adapting the application based on the at least one already present monitoring function and/or the at least one alternative monitoring function when the at least one monitoring function or the at least one alternative monitoring function is present.

10. The method according to claim 1, wherein the vehicle is a software-defined vehicle, the application is a vehicle-specific application, and the monitoring component is part of the vehicle or part of an external data processing device.

11. A device for processing data, the device comprising a vehicle computing system that is configured to monitor an application for providing at least one safety-critical function for a vehicle, the application being one of a plurality of applications of the vehicle, the vehicle computing system configured to:

execute the application, the execution of the application providing the at least one safety-critical function during runtime of the application, wherein:

at least one monitoring function is integrated into the application; and during the runtime of the application, the at least one monitoring function:

generates a defined signal that specifies at least one runtime characteristic that describes at least a course of one or more runtime events of the application, the defined signal being a standardized message having a structure corresponding to the at least one runtime characteristic; and writes the generated defined signal to a predetermined destination or resource accessible by a monitoring component external to the application; and execute the monitoring component, wherein the monitoring component is configured to:

read out the generated defined signal from the predetermined destination or resource; and monitor runtime behavior of the application during continued execution of the application based on an analysis of the read-out generated defined signal, wherein the monitoring component is configured as a system-wide monitoring component that is external to each of the plurality of applications and that monitors the plurality of applications based on respective defined signals generated by respective monitoring functions integrated into respective ones of the plurality of applications.

12. One or more non-transitory computer-readable storage media on which are stored commands for monitoring an application, the application providing at least one safety-critical function for a vehicle and being one of a plurality of applications of the vehicle, the commands, when executed by one or more processors of a computer system, causing the computer system to perform the following steps:

executing the application, the execution of the application providing the at least one safety-critical function during runtime of the application, wherein:

at least one monitoring function is integrated into the application; and during the runtime of the application, the at least one monitoring function:

generates a defined signal that specifies at least one runtime characteristic that describes at least a course of one or more runtime events of the application, the defined signal being a standardized message having a structure corresponding to the at least one runtime characteristic; and writes the generated defined signal to a predetermined destination or resource accessible by a monitoring component external to the application; and executing the monitoring component, wherein the monitoring component is configured to:

read out the generated defined signal from the predetermined destination or resource; and monitor runtime behavior of the application during continued execution of the application based on an analysis of the read-out generated defined signal, wherein the monitoring component is configured as a system-wide monitoring component that is external to each of the plurality of applications and that monitors the plurality of applications based on respective defined signals generated by respective monitoring functions integrated into respective ones of the plurality of applications.

13. The method according to claim 1, wherein the predetermined destination or resource comprises at least one of a file, a socket, a port, or a RESTful API.

14. The method according to claim 1, wherein the analysis of the read-out generated defined signal includes applying, by the monitoring component, a predefined or dynamic set of rules to the read-out generated defined signal, and wherein a result of the analysis indicates whether the read-out generated defined signal deviates from an expected value or an expected pattern.

15. The method according to claim 1, wherein the monitoring component monitors the runtime behavior of the application without accessing source code of the application and without requiring knowledge of internal functioning of the application.

16. The method according to claim 1, wherein the at least one monitoring function generates the defined signal when an expected runtime event of the application does not occur during the runtime of the application.

17. The method according to claim 1, wherein the one or more runtime events include a network message transmitted by the application, a CAN message transmitted by the application, a pattern of messages sent by the application, a pattern of messages received by the application, a structure of messages sent by the application, and/or a structure of messages received by the application.

18. The method according to claim 1, wherein the at least one runtime characteristic includes an access time, an access frequency, and/or an access sequence of the application with respect to a peripheral device, a bus, a bus system, a network, a CPU register, an operating-system resource, and/or a CPU resource of the vehicle.

19. The method according to claim 1, wherein the at least one monitoring function is provided in a library, and wherein, as a condition for allowing downloading or execution of the application, an app store or runtime environment checks whether the application uses a required set of monitoring functions including the at least one monitoring function.

20. The method according to claim 1, wherein the method further comprises checking the application and the monitoring component based on a bidirectional interaction between the application and the monitoring component, wherein the bidirectional interaction includes alternately generating messages by the monitoring component and the at least one monitoring function according to a finite state machine defining a valid sequence of messages, and wherein a valid response from the application depends on a previous message from the monitoring component.

* * * * *